United States Patent
Yamazaki et al.

(10) Patent No.: US 8,058,198 B2
(45) Date of Patent: Nov. 15, 2011

(54) CORDIERITE CERAMIC AND METHOD OF PRODUCING THE SAME

(75) Inventors: Satoshi Yamazaki, Nagoya (JP); Yuji Katsuda, Tsushima (JP); Atsushi Watanabe, Nagoya (JP); Yohei Ono, Kiyosu (JP); Takehiko Watanabe, Toki (JP)

(73) Assignee: NGK Insulators, Ltd., Nagoya (JP)

( * ) Notice: Subject to any disclaimer, the term of this patent is extended or adjusted under 35 U.S.C. 154(b) by 304 days.

(21) Appl. No.: 12/401,877

(22) Filed: Mar. 11, 2009

(65) Prior Publication Data

US 2009/0239734 A1    Sep. 24, 2009

(30) Foreign Application Priority Data

Mar. 21, 2008 (JP) .................. 2008-073183

(51) Int. Cl.
- C04B 35/03 (2006.01)
- C04B 35/04 (2006.01)
- C04B 35/00 (2006.01)
- C04B 33/24 (2006.01)
- B32B 3/12 (2006.01)

(52) U.S. Cl. ........ 501/118; 501/112; 501/122; 501/129; 501/144; 428/116

(58) Field of Classification Search ............. 501/80–85, 501/112, 118, 119, 120, 121, 122, 128–131, 501/141, 143, 144; 428/116
See application file for complete search history.

(56) References Cited

U.S. PATENT DOCUMENTS

| 4,280,845 A | 7/1981 | Matsuhisa et al. |
| 4,869,944 A | 9/1989 | Harada et al. |
| 6,203,882 B1 * | 3/2001 | Koike et al. .................. 428/116 |
| 6,402,826 B1 * | 6/2002 | Yuan et al. .................... 106/486 |
| 2003/0172846 A1 * | 9/2003 | Valadares et al. ............. 106/486 |
| 2007/0186817 A1 * | 8/2007 | Valadares et al. ............. 106/486 |

FOREIGN PATENT DOCUMENTS

| EP | 0 514 205 A1 | 11/1992 |
| JP | 53-082822 A1 | 7/1978 |
| JP | 64-003067 A1 | 1/1989 |
| JP | 05-085814 A1 | 4/1993 |
| JP | 08-198665 A1 | 8/1996 |
| JP | 11-309380 A1 | 11/1999 |

* cited by examiner

*Primary Examiner* — Jerry A Lorengo
*Assistant Examiner* — Noah Wiese
(74) *Attorney, Agent, or Firm* — Burr & Brown (57) ABSTRACT

A method of producing cordierite ceramic where the degree of stacking faults and the particle diameter of kaolinite used as a component of a cordierite-forming raw material are appropriately adjusted so that microcracks having an average width of 0.3 μm or more are introduced into the resulting cordierite ceramic to produce a high-quality cordierite ceramic that includes a cordierite crystal oriented in a specific direction and has a porosity of 25% or more and a coefficient of thermal expansion of $0.30 \times 10^{-6}$/° C. or less.

8 Claims, 4 Drawing Sheets

CORDIERITE CERAMIC AND METHOD OF PRODUCING THE SAME

BACKGROUND OF THE INVENTION

1. Field of the Invention

The present invention relates to a cordierite ceramic used as the main component of a honeycomb-structured catalyst carrier that supports a catalyst for purifying exhaust gas discharged from an internal combustion engine (e.g., automotive engine), and a method of producing the same.

2. Description of Related Art

A cordierite ceramic exhibits low thermal expansion properties, excellent heat resistance, and excellent thermal impact resistance, and has been widely used as a high-temperature gas filter or a catalyst carrier that supports a catalyst for purifying exhaust gas discharged from an automotive engine. A cordierite ceramic has been used as the main component of a honeycomb-shaped porous carrier used in automotive exhaust gas purification applications. Various technologies aimed at improving the heat resistance and the thermal impact resistance of a cordierite ceramic have been developed. Specifically, a relational expression based on strength, Young's modulus, thermal conductivity, coefficient of thermal expansion, or the like is used as an index of the thermal impact resistance of a cordierite ceramic. For example, when coefficient of thermal expansion is used as an index, a cordierite ceramic having a small coefficient of thermal expansion means a cordierite ceramic having a high thermal impact resistance. Various attempts have been made to produce a cordierite ceramic that exhibits low thermal expansion properties or high strength.

Specifically, technologies that focus on a cordierite-forming raw material (e.g., talc, kaolinite, silica, and alumina) aimed at producing a cordierite ceramic that exhibits low thermal expansion properties have been developed. For example, JP-A-53-082822 and JP-A-64-003067 disclose that a cordierite ceramic having a small coefficient of thermal expansion may be obtained by optimizing the particle diameter of the cordierite-forming raw material and the mixing ratio of the components of the raw material. JP-A-05-085814 discloses that the impurity content of a cordierite ceramic may be reduced by delaminating treatment of kaolinite used as the raw material. JP-A-05-085814 also discloses that a cordierite ceramic having a small coefficient of thermal expansion may be obtained by using a raw material containing a calcined delaminated kaolinite.

Technology that focuses on the degree of stacking faults of kaolinite has been disclosed. Specifically, JP-A-11-309380 discloses selecting kaolinite used as the raw material based on the Hinckley index (i.e., an index of the degree of stacking faults). More specifically, JP-A-11-309380 discloses that a cordierite ceramic produced using kaolinite having a Hinckley index of 0.5 or more has a low porosity (i.e., high density) and high strength.

Fine cracks called "microcracks" occur during cooling after firing for forming cordierite. It has been suggested that microcracks buffer thermal expansion of a cordierite ceramic. In JP-A-08-198665, the length of microcracks per unit area of an arbitrary cross section of a cordierite fired article is defined as a microcrack density, and a microcrack density appropriate for producing a cordierite ceramic having a small coefficient of thermal expansion is studied.

A honeycomb-structured catalyst carrier has been generally used as a high-temperature gas filter or a catalyst carrier that supports a catalyst for purifying exhaust gas discharged from an automotive engine. In order to provide a honeycomb-structured catalyst carrier with high thermal impact resistance, it is important to reduce the coefficient of thermal expansion in the direction parallel to the partition wall rather than the direction along the thickness of the partition wall. Therefore, attempts have been made to align (orient) the c-axis direction of a cordierite crystal in which the coefficient of thermal expansion is small with the direction parallel to the partition wall (i.e., align the a-axis direction which is perpendicular to the c-axis direction and in which the coefficient of thermal expansion is large with the direction along the thickness of the partition wall). Note that the degree of orientation of a cordierite crystal is determined based on an index calculated using an X-ray diffraction integrated peak intensity $I_{hkl}$. Various attempts have been made to produce a cordierite ceramic in which the c-axis direction of the cordierite crystal is oriented in the direction parallel to the partition wall of the honeycomb structure.

According the above-mentioned disclosed technologies, the indices such as the particle diameter of the cordierite-forming raw material, the mixing ratio of the components of the raw materials, the degree of stacking faults of kaolinite used as the raw material, the microcrack density in the cordierite sintered article, and the degree of orientation of the cordierite crystal are merely studied individually. In order to stably produce a cordierite ceramic that has lower thermal expansion properties and a higher porosity, it is necessary to develop technology that comprehensively deals with a phenomenon that involves the above-mentioned indices in a complex manner. However, since a phenomenon in which a cordierite ceramic is formed is a complex phenomenon that involves a number of reaction paths, technology that comprehensively deals with the above-mentioned indices has not been disclosed.

When optimizing the degree of stacking faults of kaolinite based on the Hinckley index, as disclosed in JP-A-11-309380, the Hinckley index may vary depending on the particle diameter of kaolinite. JP-A-11-309380 discloses that a honeycomb structure formed of a cordierite ceramic that has a porosity of 23.9% or less and a coefficient of thermal expansion as small as 0.04 to $0.3 \times 10^{-6}/°$ C. may be produced using kaolinite having a Hinckley index of 0.5 or more as a component of the raw material. According to JP-A-11-309380, even if kaolinite having a Hinckley index of 0.5 or more is used as a component of the raw material, the resulting cordierite ceramic has a coefficient of thermal expansion as large as 0.42 to $0.47 \times 10^{-6}/°$ C. when the porosity is high (i.e., 35 to 39%). The inventors of the present invention focused on this phenomenon. Specifically, when a cordierite ceramic used as the main component of a catalyst carrier that supports an exhaust gas purification catalyst has a low porosity, the exhaust gas purification performance deteriorates due to a decrease in the amount of catalyst supported on the catalyst carrier and a decrease in the surface area of the catalyst carrier. In order to produce a useful honeycomb structure using a cordierite ceramic, the cordierite ceramic must have low thermal expansion properties and a high porosity. Specifically, when setting the condition for the degree of stacking faults of kaolinite based on the Hinckley index, as disclosed in JP-A-11-309380, since the resulting cordierite ceramic has a porosity as low as 23.9% or less when the cordierite ceramic has a small coefficient of thermal expansion, a further improvement is necessary.

With regard to the disclosed technology relating to microcracks introduced into a cordierite fired article, the width of microcracks may affect the function of buffering the thermal expansion of a cordierite ceramic to a large extent as compared with the length of microcracks. However, the relationship between the width of microcracks and the thermal expansion properties of a cordierite ceramic has not been disclosed.

SUMMARY OF THE INVENTION

Accordingly, an object of the present invention is to comprehensively deal with a phenomenon that involves the above-mentioned indices in a complex manner, and provide a cordierite ceramic that has lower thermal expansion properties and a higher porosity and a method of producing the same.

In order to achieve the above object, the present invention provides a method of producing a cordierite ceramic having a coefficient of thermal expansion of $0.30 \times 10^6 /°$ C. or less and a porosity of 25% or more by using kaolinite having an average particle diameter of 1 to 6 µm and a Hinckley index of 0.7 or less simultaneously as a part of a cordierite forming material. The present invention also provides a method of producing a cordierite ceramic having a preferable average width of microcracks and/or the c-axis direction of a cordierite crystal in a specific direction, thereby a cordierite ceramic having a smaller coefficient of thermal expansion and a high porosity. According to the present invention, a cordierite ceramic having the above-mentioned features and a method of producing the same given below are provided.

According to a first aspect of the present invention, a method is provided for producing a cordierite ceramic comprising forming a clay of a cordierite-forming raw material containing kaolinite as one component of the cordierite-forming raw material and firing the formed clay of cordierite-forming raw material to produce a cordierite ceramic, wherein the kaolinite has an average particle diameter of 1 to 6 µm and a Hinckley index of 0.7 or less; the Hinckley index indicating a degree of stacking faults of the kaolinite.

According to a second aspect of the present invention, the method of producing a cordierite ceramic according to the first aspect is provided, wherein the cordierite ceramic has a porosity of 25% or more and an average coefficient of thermal expansion at 40 to 800° C. of $0.30 \times 10^{-6}/°$ C. or less.

According to a third aspect of the present invention, the method of producing a cordierite ceramic according to the first or second aspect is provided, wherein microcracks introduced into a surface or an arbitrary cross section of the cordierite ceramic have an average width of 0.3 µm or more.

According to a fourth aspect of the present invention, the method of producing a cordierite ceramic according to any one of the first to third aspects is provided, wherein the cordierite ceramic has a degree of orientation of 0.90 or more.

According to a fifth aspect of the present invention, a cordierite ceramic is provided, comprising kaolinite as a component of a cordierite-forming raw material, microcracks introduced into a surface or an arbitrary cross section of the cordierite ceramic having an average width of 0.3 µm or more.

According to the present invention, a cordierite ceramic that includes microcracks that buffer thermal expansion of the cordierite ceramic and have an average width of 0.3 µm or more, and has a porosity of 25% or more and an average coefficient of thermal expansion at 40 to 800° C. of $0.30 \times 10^{-6}/°$ C. or less can be provided. Therefore, the present invention is very useful industrially. In particular, the present invention is useful for producing a ceramic catalyst carrier used for an automotive exhaust gas purification device for which high heat resistance and high thermal impact resistance are required.

DETAILED DESCRIPTION OF THE INVENTION

Embodiments of the present invention are described below with reference to the tables and the drawings. Note that the present invention is not limited to the following embodiments. Various modifications and improvements may be made without departing from the scope of the present invention.

Production of a honeycomb structure that includes a cordierite ceramic produced by forming a cordierite-forming raw material including kaolinite in a honeycomb shape and firing the resulting product as the main component (e.g., a cordierite honeycomb structure 1 shown in FIG. 7) is described below as an example of the embodiments of the present invention. Note that the application of the cordierite ceramic according to the present invention is not limited to the cordierite honeycomb structure 1. The cordierite ceramic according to the present invention also exhibits a similar performance even when the cordierite ceramic has a shape corresponding to an arbitrary application.

Cordierite ($2MgO \cdot 2Al_2O_3 \cdot 5SiO_2$) used in the present invention includes 47 to 53 mass % of $SiO_2$, 33 to 38 mass % of $Al_2O_3$, and 12 to 15 mass % of MgO. Note that cordierite used in the present invention may include unavoidable impurity components (e.g., $TiO_2$, CaO, $K_2O$, $Na_2O$, and $Fe_2O_3$) in an amount of 3 mass % or less in total.

In the present invention, talc, kaolinite, calcined kaolinite, and alumina used as the main components of the raw material are mixed using a known method so that the above-mentioned chemical composition is achieved. Note that aluminum hydroxide, silica, methyl cellulose (i.e., organic binder), a surfactant, and the like may be appropriately mixed with the above-mentioned main components of the raw material to prepare a cordierite-forming raw material batch.

Figure 7:
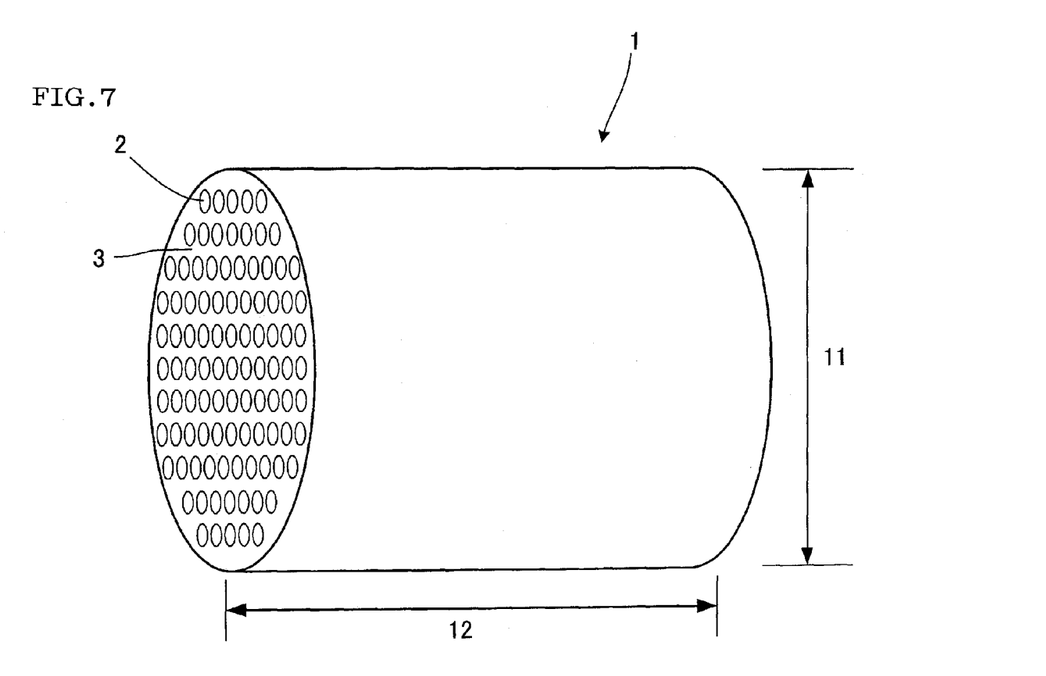
FIG. 7 is a side view showing a cordierite honeycomb structure.

For example, the cordierite honeycomb structure 1 may be produced by extruding a cordierite-forming raw material batch prepared as described above. Note that another method may also be used. The resulting honeycomb-shaped formed article is then dried and fired. For example, when producing a honeycomb structure which has a diameter 11 of 70 mm and a length 12 of 102 mm and in which a partition wall 3 has a thickness of 150 µm and the number of cells 2 per $cm^2$ is about 62, the extruded article is dried and fired at 1400 to 1440° C. for 1 to 10 hours to obtain a cordierite honeycomb structure 1. The cordierite honeycomb structure 1 includes a partition wall formed of a porous body, and a plurality of cells that are formed through the cordierite honeycomb structure 1 from one end face to the other end face and serve as fluid channels, the plurality of cells being partitioned by the partition wall.

The method of producing a cordierite ceramic according to the present invention focuses on the characteristics of kaolinite as a part of the cordierite-forming raw material, and the present inventors have found that the use of kaolinite capable of meeting the requirements as to the average particle diameter and a Hinckley index of 0.7 or less can produce a cordierite ceramic having a high porosity and a small coefficient of thermal expansion simultaneously. In the following description, kaolinite having different characteristics are used, but the mixing ratio of the respective components of the cordierite-forming raw material is not changed unless otherwise specified.

The particle diameter of the raw material kaolinite used in the present invention is discussed below. The average particle diameter (i.e., a median particle diameter determined by a particle diameter distribution measurement using a laser scattering method) of the raw material kaolinite used in the present invention is preferably 1 to 6 μm. The average particle diameter of the raw material kaolinite is more preferably 2 to 4 μm since a cordierite ceramic having at least one characteristic feature selected form the group consisting of a smaller coefficient of thermal expansion such as of $0.30 \times 10^{-6}/°C$. or less, a higher porosity such as a porosity of 25% or more and a higher degree in orientation such as, for example, 0.90 or more can be produced stably (the details of the coefficient of thermal expansion are described later). As a result, since the amount of catalyst to be supported sufficiently increases due to an increase in surface area, a cordierite honeycomb structure that includes a cordierite ceramic having a high exhaust gas purification performance (i.e., a cordierite ceramic having a porosity of 25% or more) as the main component can be produced.

Figure 1:
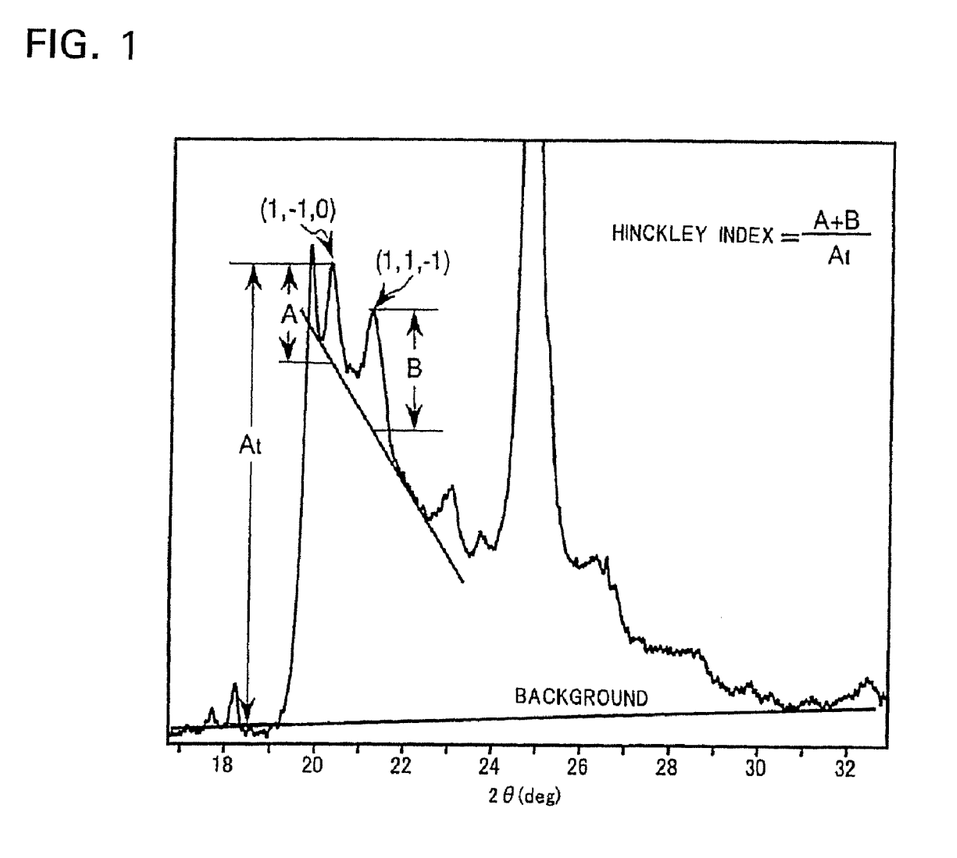
FIG. 1 is a view illustrative of the definition of a Hinckley index.
Figure 2:
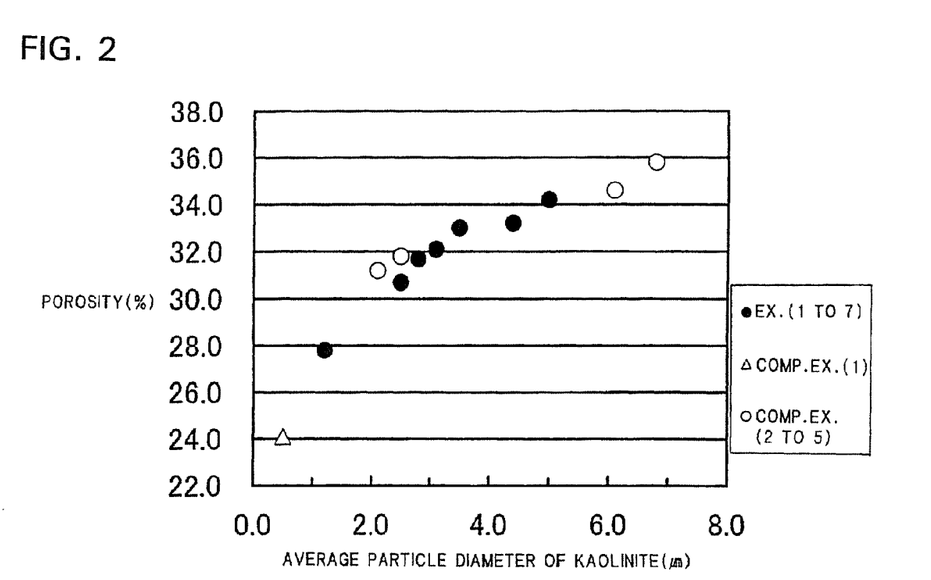
FIG. 2 is a graph showing the relationship between the average particle diameter of raw material kaolinite and the porosity of the resulting cordierite ceramic.

The degree of stacking faults of the raw material kaolinite particles used in the present invention is discussed below. The Hinckley index is an index of the degree of stacking faults of particles. An increase in Hinckley index indicates a decrease in the amount of amorphous phase present in the particle. The Hinckley index is defined as follows. FIG. 1 shows an X-ray diffraction pattern of kaolinite obtained by an X-ray powder diffraction method. A value obtained by dividing the sum (A+B) of a diffraction intensity A (1,−1,0) and a diffraction intensity B (1,1,−1) from unsymmetrical reflection (diagonal line in the pattern shown in FIG. 1) due to stacking faults by a diffraction intensity At (1,−1,0) from the background is defined as the Hinckley index.

Figure 3:
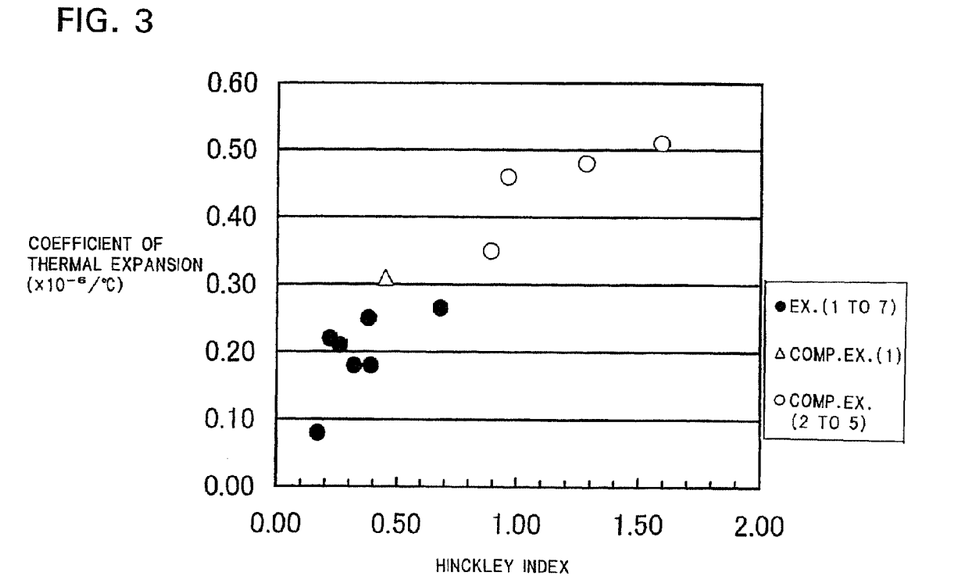
FIG. 3 is a graph showing the relationship between the Hinckley index of raw material kaolinite and the coefficient of thermal expansion of the resulting cordierite ceramic along with the axis of the honeycomb extrusion direction.

The degree of stacking faults of the raw material kaolinite particles used in the present invention based on the Hinckley index is discussed below. In order to produce a cordierite ceramic having a coefficient of thermal expansion as small as $0.30 \times 10^{-6}/°C$. or less (i.e., low thermal expansion properties) using the raw material kaolinite having an average particle diameter of 1 to 6 μm, the Hinckley index of the raw material kaolinite is preferably adjusted to 0.1 to 0.7 (refer to specimens of Examples 1 to 7 in FIG. 3). As shown in FIG. 3, when using raw material kaolinite having a small Hinckley index (i.e., an index of the degree of stacking faults), the coefficient of thermal expansion of the resulting cordierite ceramic tends to decrease. The Hinckley index of the raw material kaolinite is more preferably 0.1 to 0.4 since a cordierite ceramic in which microcracks that buffer thermal expansion have a large width can be produced stably (the details of microcracks are described later).

Figure 6:
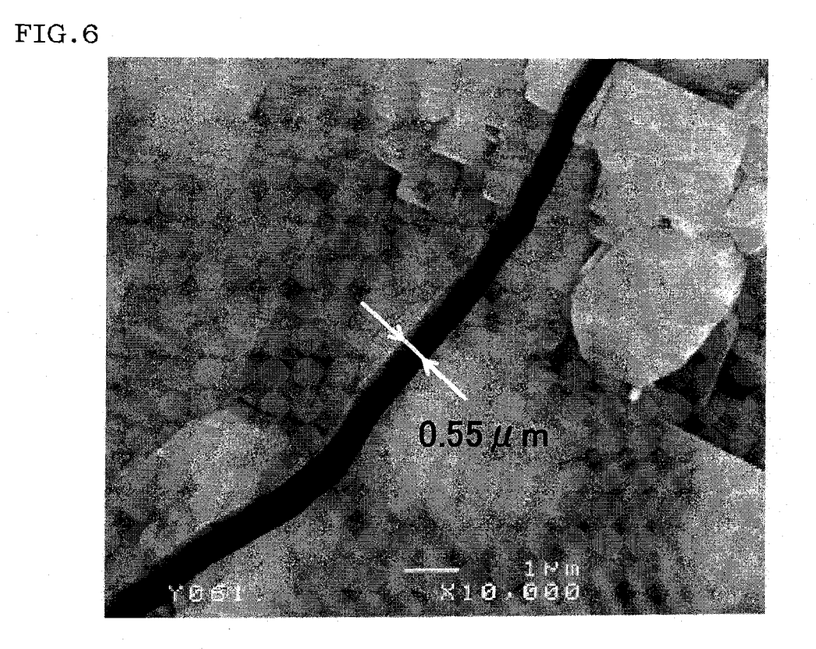
FIG. 6 shows an electron micrograph of microcracks introduced into a cordierite ceramic.

Microcracks introduced into the cordierite ceramic are discussed below. Microcracks mainly occur in the fired article during cooling after firing for forming cordierite. Microcracks have a width of about 0.01 to 2 μm and a length of about 5 to 200 μm. FIG. 6 shows a photograph of microcracks introduced into the cordierite honeycomb structure observed using a scanning electron microscope. FIG. 6 shows a microcrack width measurement example. Arrows in FIG. 6 indicate a portion of a microcrack that has a width of 0.55 μm.

Figure 4:
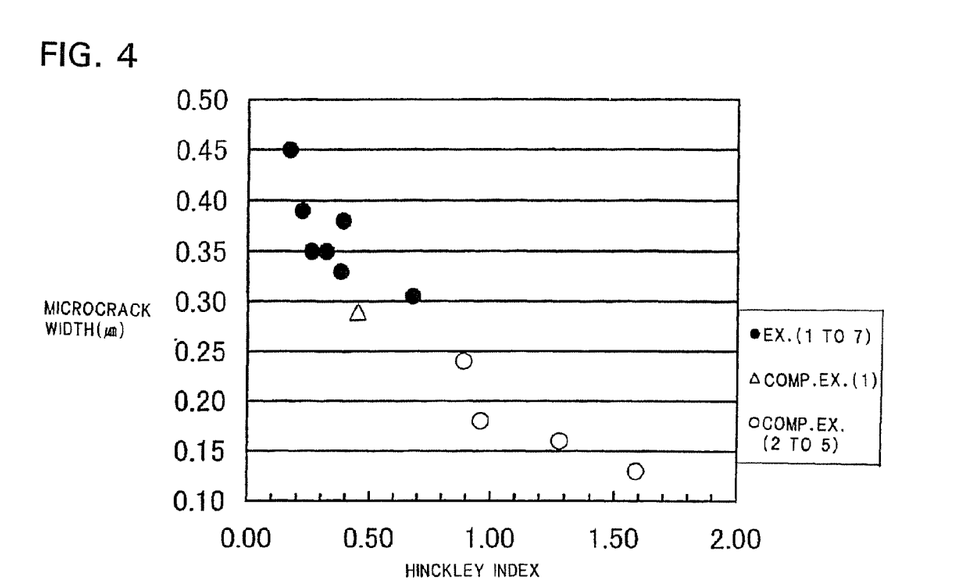
FIG. 4 is a graph showing the relationship between the Hinckley index of raw material kaolinite and the average width of microcracks introduced into the resulting cordierite ceramic.

Microcracks introduced into a cordierite ceramic produced by the method of producing a cordierite ceramic according to the present invention are described. In the method of producing a cordierite ceramic according to the present invention in which the average particle diameter of the raw material kaolinite is 1 to 6 μm and the Hinckley index of the raw material kaolinite is 0.7 or less, microcracks introduced into the cordierite ceramic have an average width of 0.3 μm or more (the details of the average width of microcracks are described later). As specimens of Examples 1 to 7 shown in Table 2 and FIG. 4, when using raw material kaolinite having a small Hinckley index (i.e., an index of the degree of stacking faults), the average width of microcracks introduced into the resulting cordierite ceramic tends to increase.

Figure 5:
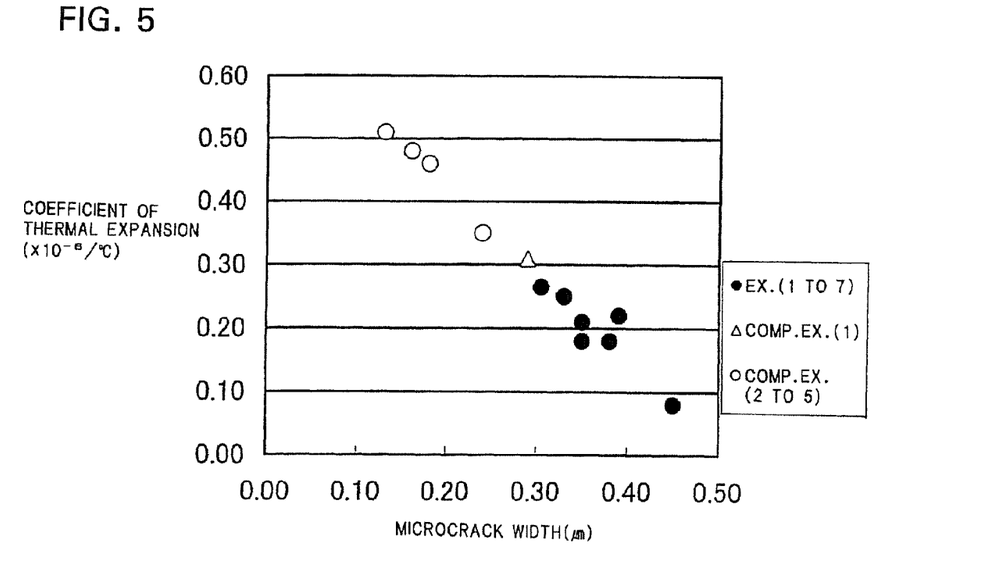
FIG. 5 is a graph showing the relationship between the average width of microcracks introduced into a cordierite ceramic and the coefficient of thermal expansion of the cordierite ceramic along with the axis of the honeycomb extrusion direction.

The relationship between the average width of microcracks introduced into the cordierite ceramic and the coefficient of thermal expansion of the cordierite ceramic is discussed below. As shown in FIG. 5, the coefficient of thermal expansion of the cordierite ceramic tends to decrease as the average width of microcracks introduced into the cordierite ceramic increases. As shown in FIG. 5, when the average width of microcracks introduced into the cordierite ceramic is 0.1 to 0.5 μm, the width of microcracks introduced into the cordierite ceramic and the coefficient of thermal expansion of the cordierite ceramic have a clear inversely proportional relationship. In the method of producing a cordierite ceramic according to the present invention, the average width of microcracks introduced into the cordierite ceramic is preferably 0.3 μm or more. The average width of microcracks introduced into the cordierite ceramic is more preferably 0.35 to 0.45 μm since the coefficient of thermal expansion of the cordierite ceramic decreases.

The average width of microcracks according to the present invention is compared with the microcrack density disclosed in JP-A-08-198665 and JP-A-09-155189. In JP-A-09-155189, the total length of microcracks introduced per unit area of a cordierite ceramic is defined as the microcrack density. JP-A-09-155189 discloses the relationship between the microcrack density and the coefficient of thermal expansion of the cordierite ceramic. According to a graph disclosed in JP-A-09-155189 in which the x-axis indicates the microcrack density ($\mu m/\mu m^2$) and the y-axis indicates the coefficient of thermal expansion ($\times 10^{-6}/°C$.), the coefficient of thermal expansion tends to decrease as the microcrack density increases. However, each specimen in the graph disclosed in JP-A-09-155189 is distributed along a hyperbolic curve rather than a straight line. Therefore, a decrease in coefficient of thermal expansion due to an increase in microcrack density is limited in a range in which the microcrack density is equal to or higher than a given reference value (refer to the range in which the microcrack density is equal to or higher than 0.004 $\mu m/\mu m^2$ shown in FIG. 5 of JP-A-09-155189). Therefore, it is not necessarily appropriate to use the microcrack density as an index in order to produce a cordierite ceramic having a smaller coefficient of thermal expansion when a cordierite ceramic that has a coefficient of thermal expansion smaller than a given level can be produced. In the present invention, the average width (μm) of microcracks and the coefficient of thermal expansion ($\times 10^{-6}/°C$.) have a clear inversely proportional relationship, as shown in FIG. 5. Since the average width of microcracks and the coefficient of thermal expansion have a linear inversely proportional relationship, it is considered to be effective to use the average width of microcracks as an index in order to produce a cordierite ceramic having a small coefficient of thermal expansion as compared with the case of using the microcrack density as an index.

The clear inversely proportional relationship between the average width of microcracks introduced into the cordierite ceramic and the coefficient of thermal expansion of the cordierite ceramic suggests that the width of microcracks is more important than the microcrack density in order to ensure that microcracks buffer thermal expansion. Based on the relationship shown in FIG. 5, it is considered that the average width of microcracks is also preferably 0.3 µm or more, and more preferably 0.35 to 0.45 µm when producing a cordierite ceramic using raw material kaolinite of which the average particle diameter and the Hinckley index are outside the above-mentioned ranges so that more excellent thermal expansion resistance can be implemented.

In summary, when the raw material kaolinite has an average particle diameter of 1 to 6 µm and a Hinckley index of 0.1 to 0.7, a cordierite ceramic having a coefficient of thermal expansion of $0.30 \times 10^{-6}/°C$. or less (i.e., low thermal expansion properties) can be produced. Specifically, when using kaolinite having a small Hinckley index (i.e., containing a large amount of amorphous phase) as a component of the raw material, it is considered that the amorphous phase is melted due to heating for firing so that reactivity with other components increases. An increase in reactivity is considered to increase the amount of liquid phase to be produced. It is considered that the liquid phase component significantly promotes the growth of a cordierite crystal domain that is oriented in the same direction as that of a cordierite crystal produced. When the cordierite crystal and the domain have been grown to a large extent, a large amount of strain occurs in the fired article during a temperature decrease process due to the anisotropy of thermal expansion of the cordierite crystal. As a result, it is considered that microcracks having a large width which buffers thermal expansion are introduced into the cordierite ceramic so that a cordierite ceramic having excellent thermal impact resistance is obtained.

The degree of orientation of the cordierite crystal in the cordierite ceramic is discussed below. For example, a cordierite honeycomb structure used as a honeycomb-structured catalyst carrier that supports a catalyst for purifying exhaust gas discharged from an internal combustion engine (e.g., automotive engine) exhibits high thermal impact resistance by providing the cordierite honeycomb structure with low thermal expansion properties. In this case, the c-axis of the cordierite crystal is oriented in the direction parallel to the partition wall of the honeycomb structure. For example, the degree of orientation of the cordierite crystal on the partition wall of the honeycomb structure is calculated by applying the X-ray diffraction integrated peak intensity $I_{hkl}$ measured using an X-ray diffractometer to the expression "$(I_{100}+I_{110})/(I_{100}+I_{110}+I_{002}+I_{004})$. The degree of orientation calculated using this expression indicates the orientation of the c-axis of the cordierite crystal in the direction parallel to the partition wall. The degree of orientation of the c-axis of the cordierite crystal in the direction parallel to the partition wall increases as the degree of orientation calculated using the above expression increases. A cordierite honeycomb structure produced by the method according to the present invention using kaolinite that has an average particle diameter of 1 to 6 µm and a Hinckley index of 0.1 to 0.7 has a degree of cordierite crystal orientation defined above of 0.90 or more. Specifically, a cordierite honeycomb structure in which the c-axis of the cordierite crystal is oriented in the direction parallel to the partition wall of the honeycomb structure can be obtained.

A method that adds a large amount of silica as the cordierite-forming raw material may be used. However, when a large amount of silica is added as the cordierite-forming raw material, the degree of orientation of the c-axis direction of the cordierite crystal in the direction parallel to the partition wall of the honeycomb structure may deteriorate. Therefore, the amount of silica added as the cordierite-forming raw material is preferably 5 mass % or less.

As described above, a cordierite ceramic obtained using kaolinite that has an average particle diameter of 1 to 6 µm and a Hinckley index of 0.7 or less as the raw material exhibits excellent thermal impact resistance due to low thermal expansion properties. Therefore, the cordierite honeycomb structure 1 as shown in FIG. 7 produced using the cordierite ceramic exhibits high heat resistance and high thermal expansion resistance.

EXAMPLES

The present invention is further described below by way of examples. Note that the present invention is not limited to the following examples.

(Preparation of Cordierite-Forming Raw Material)

Kaolinite having a particle diameter and a Hinckley index shown in Table 2 was used as a component of a cordierite-forming raw material, and was mixed with other components (talc and the like) in a mixing ratio shown in Table 1 to prepare cordierite-forming raw material batches of Examples 1 to 7 and Comparative Examples 1 to 5. The raw material kaolinite of Example 7 was prepared by grinding the raw material kaolinite of Example 6. Methyl cellulose (organic binder) and a surfactant were added to the cordierite-forming raw material in amounts of 5.0 mass % and 0.5 mass %, respectively. Table 1 shows the raw material composition (mass %) of Examples 1 to 7 and Comparative Examples 1 to 5.

TABLE 1

| Component | Composition (mass %) |
|---|---|
| Talc | 40.4 |
| Kaolinite | 14.9 |
| Calcined kaolinite | 27.8 |
| Alumina | 11.7 |
| Aluminum hydroxide | 4.8 |
| Silica | 0.4 |

(Production of Honeycomb Structure)

A honeycomb structure (diameter 11: 70 mm, length 12: 102 mm, thickness of partition wall 3: 150 µm, number of cells 2 per cm$^2$: about 62) was extruded by a known extrusion method using each of the cordierite-forming raw material batches of Examples 1 to 7 and Comparative Examples 1 to 5 (see FIG. 7). The resulting extruded article was dried and fired at 1430° C. for five hours to obtain a cordierite honeycomb structure 1.

(Evaluation)

The width of microcracks, the degree of orientation of the c-axis direction of the cordierite crystal in the direction parallel to the partition wall of the honeycomb structure (Cd orientation), the porosity, and the coefficient of thermal expansion were used as indices for evaluating the cordierite honeycomb structures 1 of Examples 1 to 7 and Comparative Examples 1 to 5. Table 2 and FIGS. 2 to 5 (graphs) show the evaluation results for Examples 1 to 7 and Comparative Examples 1 to 5. The evaluation results for each index are discussed below.

TABLE 2

|  |  | Hinckley index of kaolinite | Average particle diameter of kaolinite (μm) | Width of microcracks (μm) | Cd orientation | Porosity (%) | Coefficient of thermal expansion (×10$^{-6}$/° C.) |
|---|---|---|---|---|---|---|---|
| Example | 1 | 0.17 | 2.5 | 0.45 | 0.93 | 30.7 | 0.08 |
|  | 2 | 0.39 | 2.8 | 0.38 | 0.93 | 31.7 | 0.18 |
|  | 3 | 0.68 | 3.1 | 0.31 | 0.93 | 32.1 | 0.27 |
|  | 4 | 0.22 | 4.4 | 0.39 | 0.91 | 33.2 | 0.22 |
|  | 5 | 0.26 | 1.2 | 0.35 | 0.94 | 27.8 | 0.21 |
|  | 6 | 0.38 | 5.0 | 0.33 | 0.91 | 34.2 | 0.25 |
|  | 7 | 0.32 | 3.5 | 0.35 | 0.92 | 33.0 | 0.18 |
| Comparative Example | 1 | 0.45 | 0.5 | 0.29 | 0.94 | 24.1 | 0.31 |
|  | 2 | 0.89 | 6.8 | 0.24 | 0.90 | 35.8 | 0.35 |
|  | 3 | 0.96 | 2.5 | 0.18 | 0.92 | 31.8 | 0.46 |
|  | 4 | 1.28 | 6.1 | 0.16 | 0.89 | 34.6 | 0.48 |
|  | 5 | 1.59 | 2.1 | 0.13 | 0.93 | 31.2 | 0.51 |

The cordierite honeycomb structures 1 obtained in Examples 1 to 7 had a porosity of 25% or more, an average microcrack width of 0.3 μm or more, and a coefficient of thermal expansion of 0.27×10$^{-6}$/° C. or less. On the other hand, the cordierite honeycomb structure 1 obtained in Comparative Example 1 had a porosity of less than 25%, an average microcrack width of less than 0.3 μm, and a coefficient of thermal expansion of 0.31×10$^{-6}$/° C. or more. The cordierite honeycomb structures 1 obtained in Comparative Examples 2 to 5 had a porosity almost equal to those of Examples 1 to 7, but had an average microcrack width of less than 0.3 μm and a coefficient of thermal expansion of 0.31×10$^{-6}$/° C. or more. Therefore, the cordierite honeycomb structures 1 obtained in Comparative Examples 1 to 5 were inferior to the cordierite honeycomb structures 1 obtained in Examples 1 to 7.

The relationship between the particle diameter of the raw material kaolinite and the porosity of the resulting cordierite honeycomb structure 1 is discussed below. The average particle diameter of the raw material kaolinite refers to a median particle diameter determined by a particle diameter distribution measurement using a laser scattering method. The porosity was measured by mercury porosimetry. As shown in Table 2 and FIG. 2, the porosity of the resulting cordierite honeycomb structure 1 increased as the average particle diameter of the raw material kaolinite increased. In Examples 1 to 7 in which the average particle diameter of the raw material kaolinite was 1 to 6 μm, the cordierite honeycomb structures 1 had a porosity of 25% or more.

The relationship between the degree of stacking faults of the raw material kaolinite and the coefficient of thermal expansion of the resulting cordierite honeycomb structure 1 is discussed below. The Hinckley index of the raw material kaolinite was calculated as described above from an X-ray diffraction pattern obtained by an X-ray powder diffraction method. The coefficient of thermal expansion along with the axis of the honeycomb extrusion direction was measured by push-rod dilatometry with the sample of 50 mm length.

As shown in Table 2 and FIG. 3, when using the raw material kaolinite having a small Hinckley index (i.e., an index of the degree of stacking faults), the coefficient of thermal expansion of the resulting cordierite honeycomb structure 1 decreased. In Examples 1 to 7 in which the Hinckley index of the raw material kaolinite was 0.1 to 0.7, the cordierite honeycomb structures 1 had a coefficient of thermal expansion of 0.30×10$^{-6}$/° C. or less. In Comparative Examples 2 to 4 in which the Hinckley index of the raw material kaolinite was 0.89 to 1.59 (>0.7), the cordierite honeycomb structures 1 had a coefficient of thermal expansion of 0.35 to 0.51×10$^{-6}$/° C. (i.e., the thermal expansion resistance was inferior to those of Examples 1 to 7).

The effects of the particle diameter and the Hinckley index of the raw material kaolinite on the coefficient of thermal expansion of the resulting cordierite honeycomb structure 1 are discussed below. Example 1 and Comparative Example 3 in which the average particle diameter of the raw material kaolinite was 2.5 μm are compared below. In Example 1, the Hinckley index of the raw material kaolinite was 0.17 (i.e., within the range of 0.1 to 0.7), and the cordierite honeycomb structure 1 had a coefficient of thermal expansion as small as 0.08×10$^{-6}$/° C. In Comparative Example 3, the Hinckley index of the raw material kaolinite was 0.96 (>0.7), and the cordierite honeycomb structure 1 had a coefficient of thermal expansion of 0.46×10$^{-6}$/° C. (i.e., outside the range of the present invention).

In Comparative Example 1, the raw material kaolinite had a Hinckley index of 0.45 (i.e., within the range of 0.1 to 0.7), but had an average particle diameter of 0.5 μm (i.e., outside the range of 1 to 6 μm). The cordierite honeycomb structure 1 obtained in Comparative Example 1 had a coefficient of thermal expansion of 0.31×10$^{-6}$/° C. which does not reach the target level of coefficient of thermal expansion. Therefore, in order to produce a cordierite honeycomb structure 1 having a coefficient of thermal expansion of 0.30×10$^{-6}$/° C. or less which is thermal expansion properties below the target level, the raw material kaolinite must have an average particle diameter of 1 to 6 μm and a Hinckley index of 0.7 or less.

The average width of microcracks introduced into the cordierite honeycomb structure 1 was determined by the following method. The surface of the partition wall of the cordierite honeycomb structure 1 was observed using a scanning electron microscope ("JSM-6300" manufactured by JEOL Ltd.). Three rectangular areas (length: 100 μm, width: 130 μm) were defined on the surface of the partition wall of each cordierite honeycomb structure 1. The open width of microcracks in each area was measured at intervals of 20 μm. The total open width was divided by the number of measurement points to calculate the average width of microcracks in each area. The average widths of microcracks in the three areas were summed up and averaged to calculate the average width of microcracks introduced into the cordierite honeycomb structure 1.

The relationship between the degree of stacking faults of the raw material kaolinite and the average width of microcracks introduced into the cordierite honeycomb structure 1 is discussed below. As shown in Table 2 and FIG. 4, when using the raw material kaolinite having a small Hinckley index, the average width of microcracks introduced into the resulting cordierite honeycomb structure 1 increased. In Examples 1 to 7 in which the raw material kaolinite had an average particle diameter of 1 to 6 μm and a Hinckley index of 0.1 to 0.7, the average width of microcracks introduced into the cordierite honeycomb structure 1 was 0.3 μm or more. On the other hand, the average width of microcracks introduced into the cordierite honeycomb structures 1 obtained in Comparative Examples 2 to 4 in which the raw material kaolinite had a Hinckley index of more than 0.7 was as small as 0.13 to 0.24 μm.

The average width of microcracks introduced into the cordierite honeycomb structure 1 obtained in Comparative Example 1 was 0.29 μm. This value did not satisfy the target level of the average width of 0.3 μm or more of microcracks introduced into the cordierite ceramics obtained in Examples 1 to 7. It is clear from the comparison between Examples 1 to 7 and Comparative Example 1 that the raw material kaolinite must have a Hinckley index of 0.1 to 0.7 and an average particle diameter of 1 to 6 μm in order to produce a cordierite ceramic in which the average width of microcracks is 0.3 μm or more.

The relationship between the average width of microcracks introduced into the cordierite honeycomb structure 1 and the coefficient of thermal expansion of the cordierite honeycomb structure 1 is discussed below. As shown in FIG. 5, when the average width of microcracks introduced into the cordierite honeycomb structure 1 was 0.13 to 0.45 μm, a clear inversely proportional relationship in which the coefficient of thermal expansion of the cordierite honeycomb structure 1 decreased as the average width of microcracks introduced into the cordierite honeycomb structure 1 increased was observed.

The degree of orientation of the cordierite honeycomb structures 1 obtained in Examples 1 to 7 and Comparative Examples 1 to 5 is defined by the expression "$(I_{100}+I_{110})/(I_{100}+I_{110}+I_{002}+I_{004})$". The X-ray diffraction integrated peak intensity $I_{hkl}$ of the hkl plane of the cordierite crystal was measured using an X-ray diffractometer ("RINT 2500" manufactured by Rigaku Corporation, (50 kV, 300 mA)). The degree of orientation calculated using the above expression indicates the orientation of the c-axis of the cordierite crystal in the direction parallel to the partition wall. The degree of orientation of the c-axis of cordierite in the direction parallel to the partition wall increases as the degree of orientation calculated using the above expression increases.

In the cordierite honeycomb structures 1 obtained in Examples 1 to 7, the degree of orientation of the cordierite crystal defined above was 0.90 or more. In Examples 1 to 3 and 5, the degree of orientation of the cordierite honeycomb structure 1 was 0.93 or more. In Comparative Examples 1 to 5, the degree of orientation of the cordierite honeycomb structures 1 varied in the range of 0.89 to 0.94 (see Table 2). Therefore, it is clear that the cordierite honeycomb structures 1 obtained in Examples 1 to 7 have the degree of orientation of 0.90 or more, and have the cordierite crystal stably oriented in a specific direction as compared with the cordierite honeycomb structures 1 obtained in Comparative Examples 1 to 5.

The present invention relates to the cordierite ceramic used as the main component of a honeycomb-structured catalyst carrier that supports a catalyst for purifying exhaust gas discharged from an internal combustion engine (e.g., automotive engine), and the method of producing the same.

What is claimed is:

1. A method of producing a cordierite ceramic comprising forming a clay of a cordierite-forming raw material containing kaolinite as one component of the cordierite-forming raw material and firing the formed clay of cordierite-forming raw material to produce a cordierite ceramic, wherein the kaolinite has an average particle diameter of 1 to 6 μm and a Hinckley index of 0.4 or less; wherein the Hinckley index indicates a degree of stacking faults of the kaolinite, and wherein the cordierite ceramic has an average coefficient of thermal expansion at 40 to 800° C. of $0.25 \times 10^{-6}/°$ C. or less.

2. The method of producing a cordierite ceramic according to claim 1, wherein the cordierite ceramic has a porosity of 25% or more.

3. The method of producing a cordierite ceramic according to claim 1, wherein microcracks introduced into a surface or an arbitrary cross section of the cordierite ceramic have an average width of 0.3 μm or more.

4. The method of producing a cordierite ceramic according to claim 2, wherein microcracks introduced into a surface or an arbitrary cross section of the cordierite ceramic have an average width of 0.3 μm or more.

5. The method of producing a cordierite ceramic according to claim 1, wherein the cordierite ceramic has a degree of orientation of 0.90 or more.

6. The method of producing a cordierite ceramic according to claim 2, wherein the cordierite ceramic has a degree of orientation of 0.90 or more.

7. The method of producing a cordierite ceramic according to claim 3, wherein the cordierite ceramic has a degree of orientation of 0.90 or more.

8. The method of producing a cordierite ceramic according to claim 4, wherein the cordierite ceramic has a degree of orientation of 0.90 or more.

* * * * *